(12) United States Patent
Rostron

(10) Patent No.: US 12,410,627 B2
(45) Date of Patent: *Sep. 9, 2025

(54) TRACK SYSTEM FOR PLACING SHAPED BODIES

(71) Applicant: 3DM Tool LLC, Garden City, MI (US)

(72) Inventor: Derek Rostron, Belleville, MI (US)

(73) Assignee: 3DM Tool LLC, Garden City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,126

(22) Filed: Jul. 12, 2023

(65) Prior Publication Data

US 2023/0349180 A1 Nov. 2, 2023

Related U.S. Application Data

(63) Continuation of application No. 18/164,001, filed on Feb. 3, 2023, now abandoned, which is a continuation of application No. 17/559,728, filed on Dec. 22, 2021, now Pat. No. 11,598,109.

(51) Int. Cl.
E04G 21/18 (2006.01)

(52) U.S. Cl.
CPC .............................. *E04G 21/1875* (2013.01)

(58) Field of Classification Search
CPC ............... E04G 11/062; E04G 21/1841; E04G 21/1875; E01C 11/221; E01C 11/222; A01G 9/28; E04H 13/003
USPC ..................................... 52/102; 47/33; 404/7
See application file for complete search history.

(56) References Cited

U.S. PATENT DOCUMENTS

| | | | |
|---|---|---|---|
| 2,924,021 A | | 2/1960 | Proett et al. |
| 5,006,011 A | | 4/1991 | Hiyashi |
| 5,073,061 A | * | 12/1991 | Jones ............... E01C 11/221 404/8 |
| 5,240,343 A | * | 8/1993 | Strobl, Jr. .......... E01C 11/221 404/8 |
| D372,547 S | * | 8/1996 | Sjodin ...................... D25/164 |
| 5,640,801 A | * | 6/1997 | Rynberk ................ A01G 9/28 47/33 |
| 5,993,107 A | * | 11/1999 | Bauer ..................... A01G 9/28 404/34 |
| 6,071,038 A | * | 6/2000 | Strobl, Jr. .......... E01C 11/221 47/33 |
| 6,324,783 B1 | * | 12/2001 | McIntyre ............... A01G 9/28 47/33 |
| 6,379,078 B1 | * | 4/2002 | Zwier ................... E01C 11/08 404/4 |
| 6,568,126 B2 | * | 5/2003 | Womack ................. E02B 3/04 47/33 |
| 6,708,418 B1 | | 3/2004 | Schafer |
| 6,757,983 B1 | | 7/2004 | Moon |

(Continued)

FOREIGN PATENT DOCUMENTS

| | | | | |
|---|---|---|---|---|
| DE | 102007044694 A1 | * | 4/2009 | ............ E01C 11/221 |
| GB | 2376863 A | * | 12/2002 | ............... A01G 1/08 |

(Continued)

*Primary Examiner* — Ryan D Kwiecinski
(74) *Attorney, Agent, or Firm* — Brooks Kushman.P.C.

(57) ABSTRACT

A support structure for placing shaped bodies such as landscaping bricks. The support structures may be coupled together to form a track of a predetermined shape. The track may be configured to receive and place the shaped bodies in framed sections to form a landscaping barrier.

19 Claims, 8 Drawing Sheets

(56) References Cited

U.S. PATENT DOCUMENTS

| | | | |
|---|---|---|---|
| 7,144,201 B2* | 12/2006 | DeArmond, Jr. | E04H 13/003 47/33 |
| 7,344,334 B2 | 3/2008 | Thorkelson | |
| 7,774,993 B2* | 8/2010 | Strobl, Jr. | E01C 11/221 47/33 |
| 9,232,698 B1* | 1/2016 | Williams | A01G 9/28 |
| 10,729,077 B2* | 8/2020 | Bahler | A01G 9/28 |
| 2002/0141821 A1 | 10/2002 | Guidon | |
| 2003/0188478 A1* | 10/2003 | Womack | E02B 3/00 47/33 |
| 2008/0104896 A1* | 5/2008 | Strobl | A01G 9/28 52/101 |
| 2009/0232597 A1* | 9/2009 | Zwier | E01C 11/221 404/17 |
| 2010/0186293 A1* | 7/2010 | Flynn | A01G 9/28 47/33 |
| 2014/0026476 A1* | 1/2014 | Murphy | A01G 9/28 47/33 |
| 2014/0259902 A1* | 9/2014 | Friederichs | A01G 9/28 47/33 |
| 2018/0216309 A1* | 8/2018 | McPherson | E02D 31/06 |
| 2019/0174685 A1* | 6/2019 | Wang | A01G 9/28 |

FOREIGN PATENT DOCUMENTS

| | | | | |
|---|---|---|---|---|
| GB | 2443413 A | * | 5/2008 | E04H 13/003 |
| GB | 2518183 A | * | 3/2015 | A01G 1/08 |

* cited by examiner

TRACK SYSTEM FOR PLACING SHAPED BODIES

CROSS-REFERENCE TO RELATED APPLICATIONS

This application is a continuation of U.S. application Ser. No. 18/164,001, filed Feb. 3, 2023, now abandoned, which is a continuation of U.S. application Ser. No. 17/559,728, filed Dec. 22, 2021, now U.S. Pat. No. 11,598,109, issued Mar. 7, 2023, the disclosure of which is hereby incorporated in its entirety by reference herein.

TECHNICAL FIELD

The present disclosure relates to a track system for placing shaped bodies, for example, a device for setting, positioning, and/or securing masonry, and more particularly for masonry used in landscaping or gardening.

BACKGROUND

Landscapes and/or gardens surrounding an individual's home and property can add value to the property. Landscaping can add aesthetic appeal as well as accentuate specific features. In many modern families and homes land care, gardening, and landscaping can be both a hobby and a source of pride. Professional or do-it-yourself efforts may be employed for landscaping. Often landscaping involves trees, shrubs, grass, and paths in well-defined spaces. For example, many modern homes have a garden including bushes and/or flowers along their house with a lawn adjacent to or in front of and behind their home as well as a hard path (e.g., a sidewalk) to their doorways. These spaces may be delineated by materials such as landscaping bricks (e.g., masonry) or stones that can withstand the outdoor environment. Other garden areas or delineation such as around a tree or bush may be used. Creating these divisions is not only aesthetically appealing but can assist with care and maintenance.

SUMMARY

A track system for placing shaped bodies in a pattern is provided. The track system may include a plurality of support structures. Each support structure may include a support surface and a placing surface opposite the support surface. An inner wall or placing strut may extend from the support surface and one or more anchors may extend from the placing surface to, for example, anchor or place it on the ground. Each support structure may also include first and second fasteners for coupling adjacent support structures together. When coupled together the placing struts from adjacent support structures cooperate to provide framed sections configured to place a shaped body such as a landscaping brick.

In another embodiment, a support structure for placing shaped bodies is provided. The support structure has a support surface and a placing surface opposite the support surface. An inner partition may protrude from the support surface and one or more anchors may protrude from the placing surface. One or more fasteners may be configured to couple the support surface to an additional support surface of another support structure such that when coupled a track with framed sections defined by the inner partition is provided. The one or more fasteners may include first and second fasteners. The framed sections each being configured to place a shaped body of the shaped bodies.

In yet another embodiment, a landscaping barrier is disclosed. The landscaping barrier includes a plurality of support structures that when coupled together define sections configured to support a shaped body such as a masonry block. At least one of the support structure from the plurality of support structures including a base having a framing wall extending in a first direction from the base. The support structure also includes one or more anchors extending from the base in a second direction that may be opposite the first direction. The support structure having a coupling means for coupling it to at least two other support structures from the plurality of support structures such that the framing walls of adjacent support structures define the sections.

DETAILED DESCRIPTION

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Figure 1:
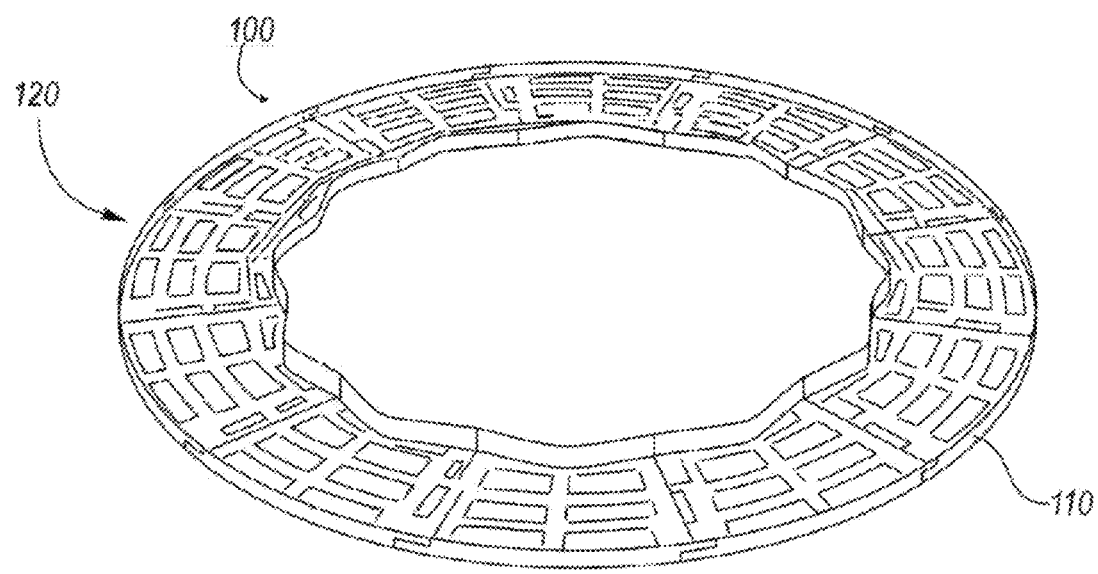
FIG. 1 is a perspective view of a plurality of support structures forming a track in a predetermined shape.
Figure 2:
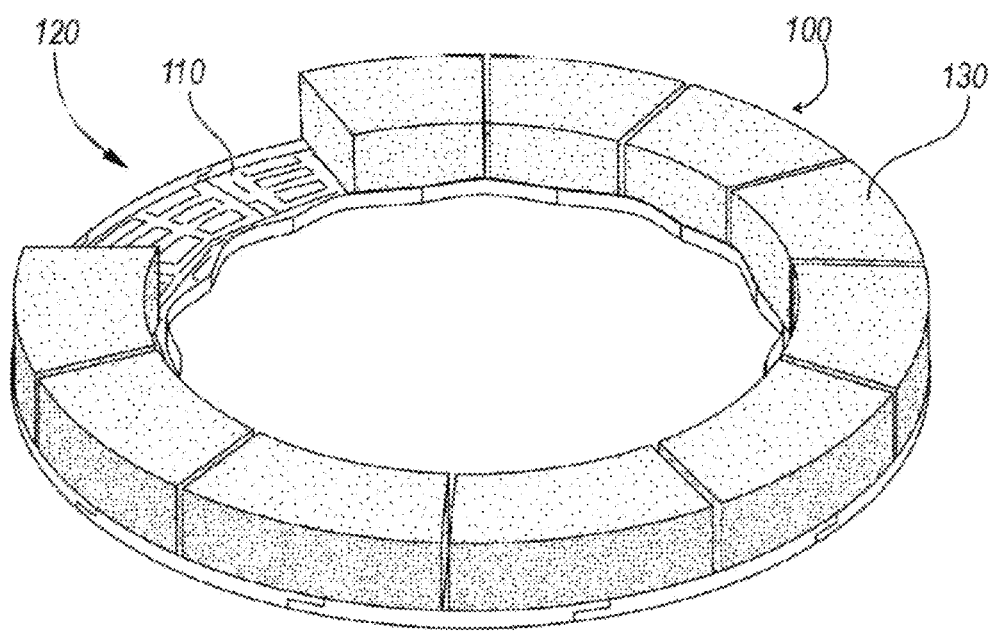
FIG. 2 is a perspective view of a landscaping barrier.
Figure 3:
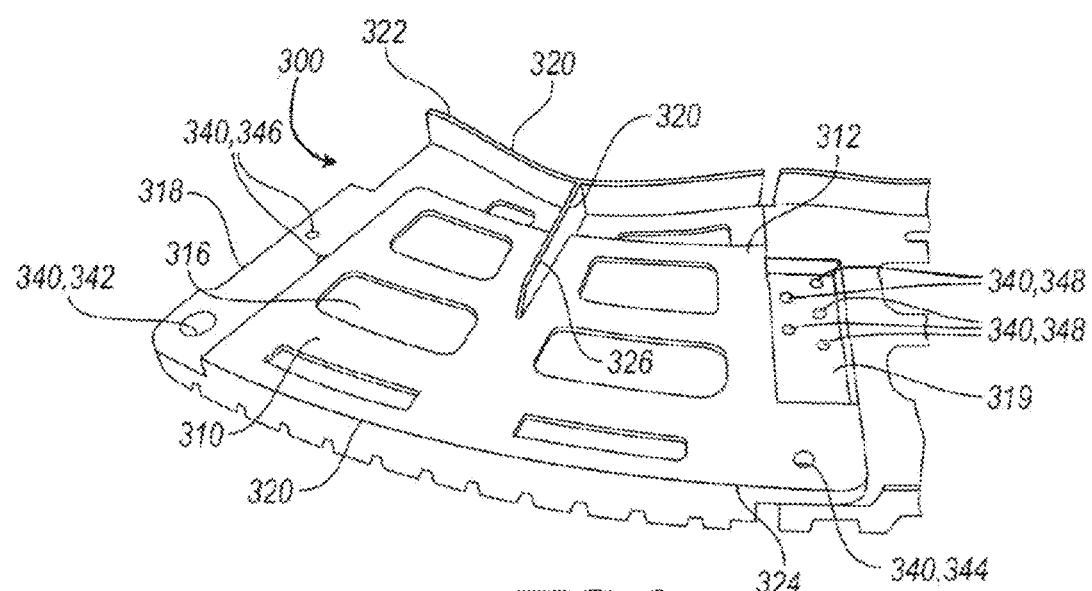
FIG. 3 is a perspective view of a support structure.
Figure 4:
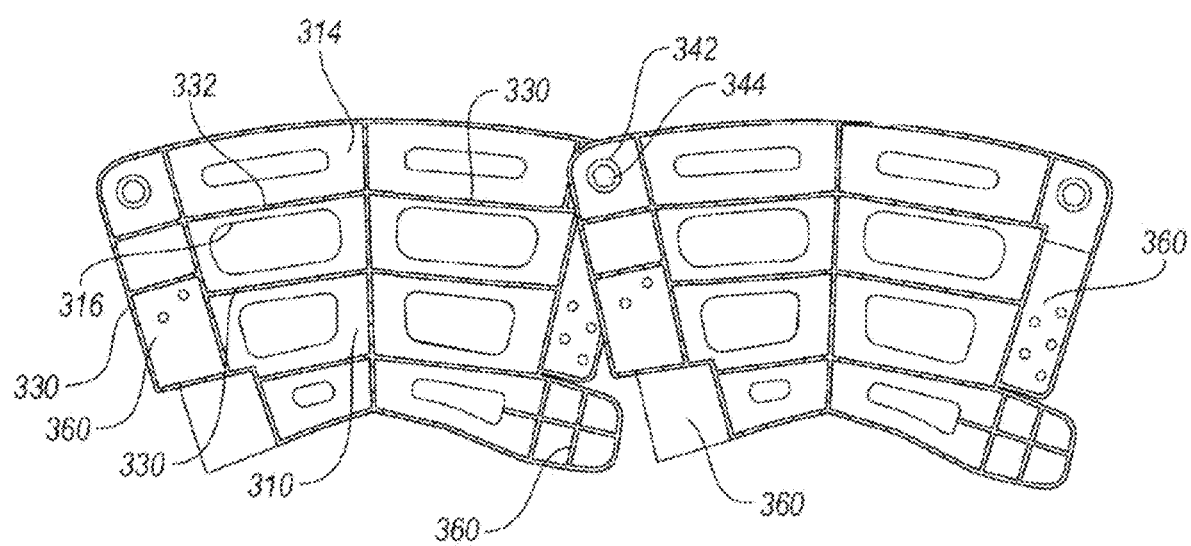
FIG. 4 is bottom view of a support structure coupled to an adjacent support structure by a fastener.

A track system for setting, placing, and/or securing, for example, landscaping masonry blocks in a pattern is provided. As shown in FIG. 1, track system 100 includes a plurality of support structures 110 forming track 120 having a predetermined shape. The predetermined shape may be any suitable shape and size such as round, straight, a circle, an oval, a square, a rectangle, a triangle, a pentagon, a hexagon, a heptagon, an octagon, a polygon, a straight line, a curved line, or any combination thereof. The track 120 and/or support structures 110 may form a landscaping barrier. The track 120 and/or support structures 110 may be configured to support a shaped body 130 such as a landscaping brick as shown in FIG. 2.

Support structure 300, as shown in FIGS. 3-4, 6 and 7-18 may include a base 310 having a support surface 312 and a securing/placing surface 314 opposite the support surface 312. Base 310 may have one or more irrigating/irrigation apertures 316. In one or more embodiments, support surface 312 is configured to support a shaped body. In one or more embodiments, the support surface may include a series of walls 320 extending or protruding therefrom. Walls 320 may include inner peripheral wall 322 extending from an inner edge of support surface 312, outer peripheral wall 324 extending from an outer edge of support surface 312, and one or more internal walls or partitions 326. In one or more embodiments, the one or more internal walls 326 is an internal or securing strut. The securing strut may protrude from support surface 312 along the width of support surface 312 or along a portion of the width. In a variation, walls 320 may extend in a first direction from the support surface 312.

Figure 5:
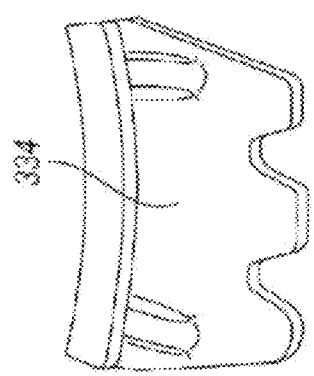
FIGS. 5 and 6 are views of an anchor attachment.
Figure 6:
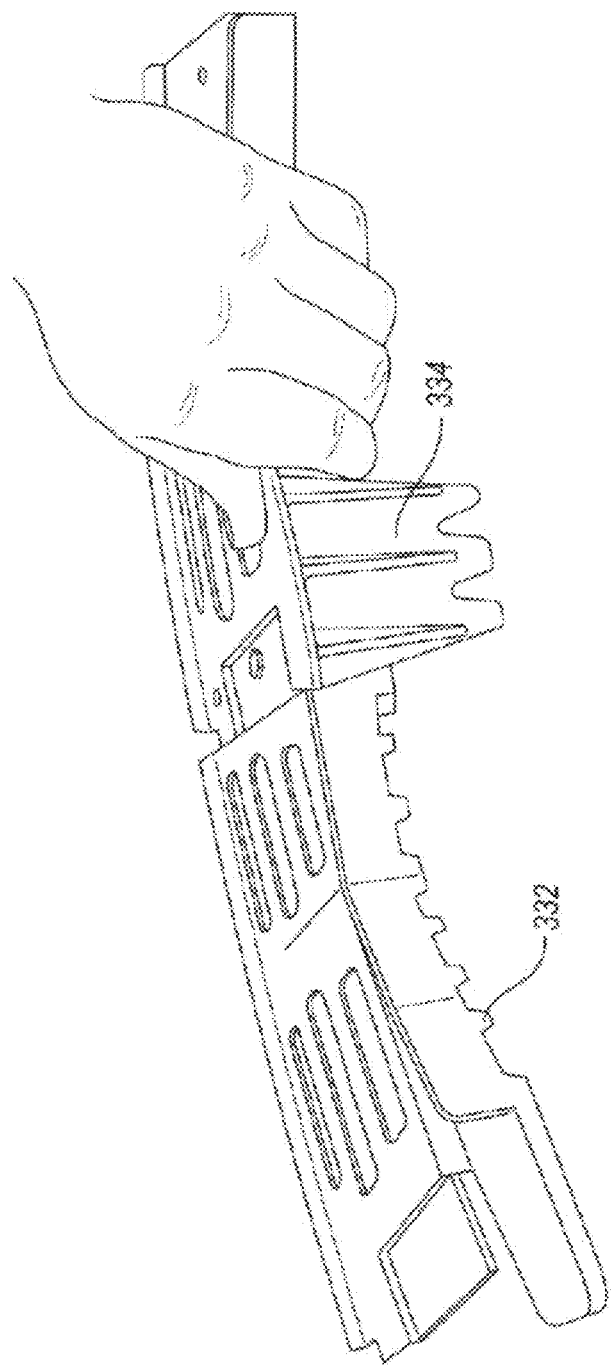
Figure 7:
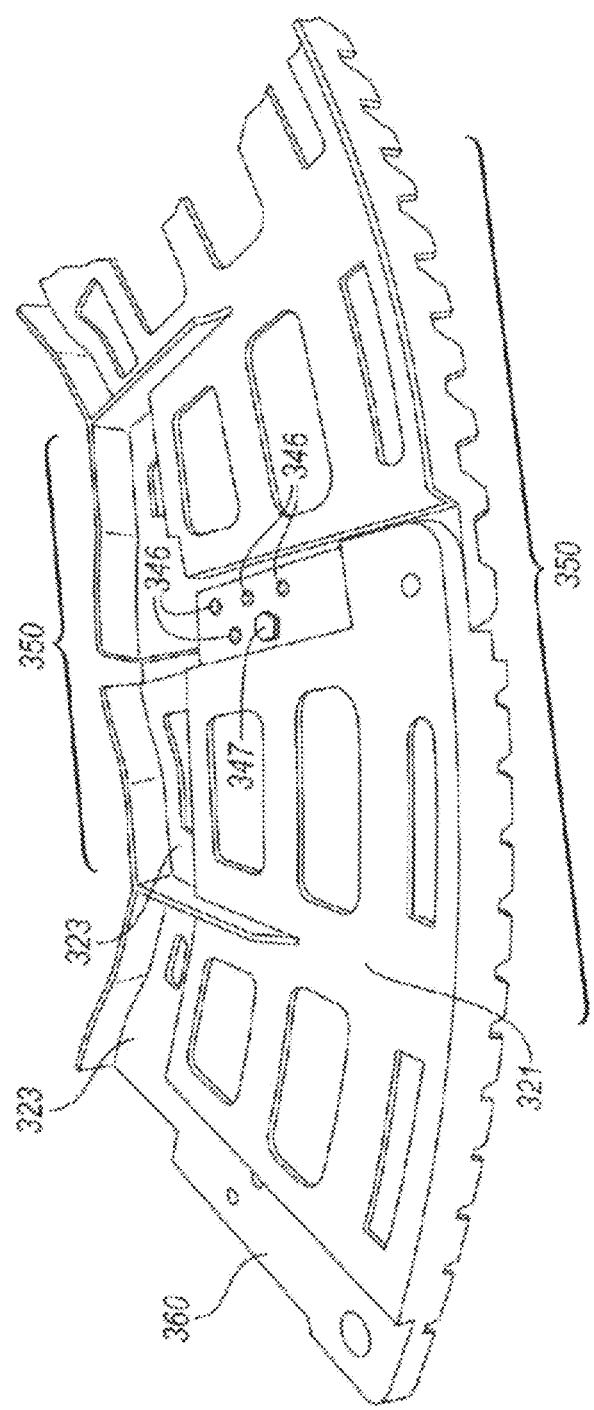
FIG. 7 is a top, perspective view of a support structure coupled to an adjacent support structure by fasteners.
Figure 8:
FIG. 8 is a front view of a support structure.
Figure 11:
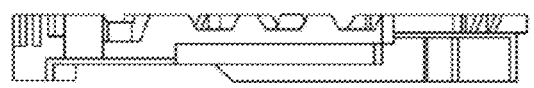
FIG. 11 is a side view from the right side of a support structure.
Figure 12:
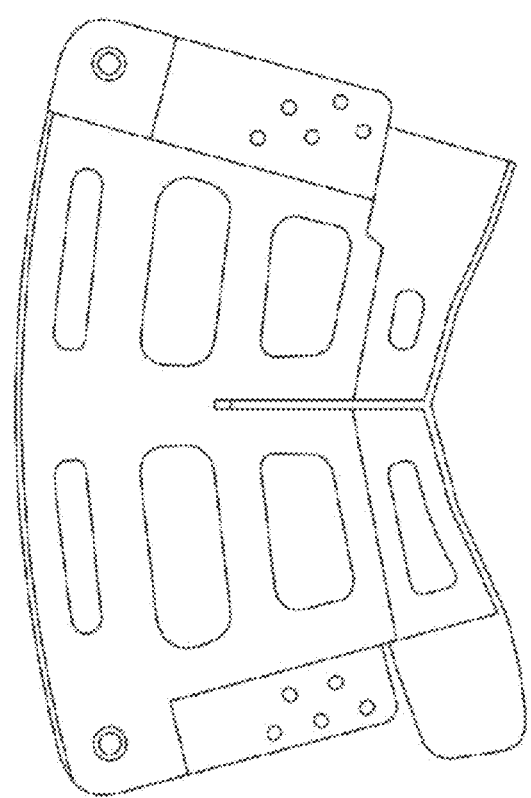
FIG. 12 is a top view of the support structure.
Figure 9:
FIG. 9 is a back view of a support structure.
Figure 10:
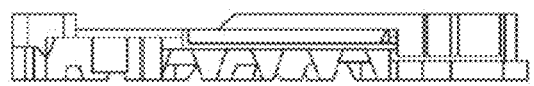
FIG. 10 is a side view from the left side of a support structure.
Figure 13:
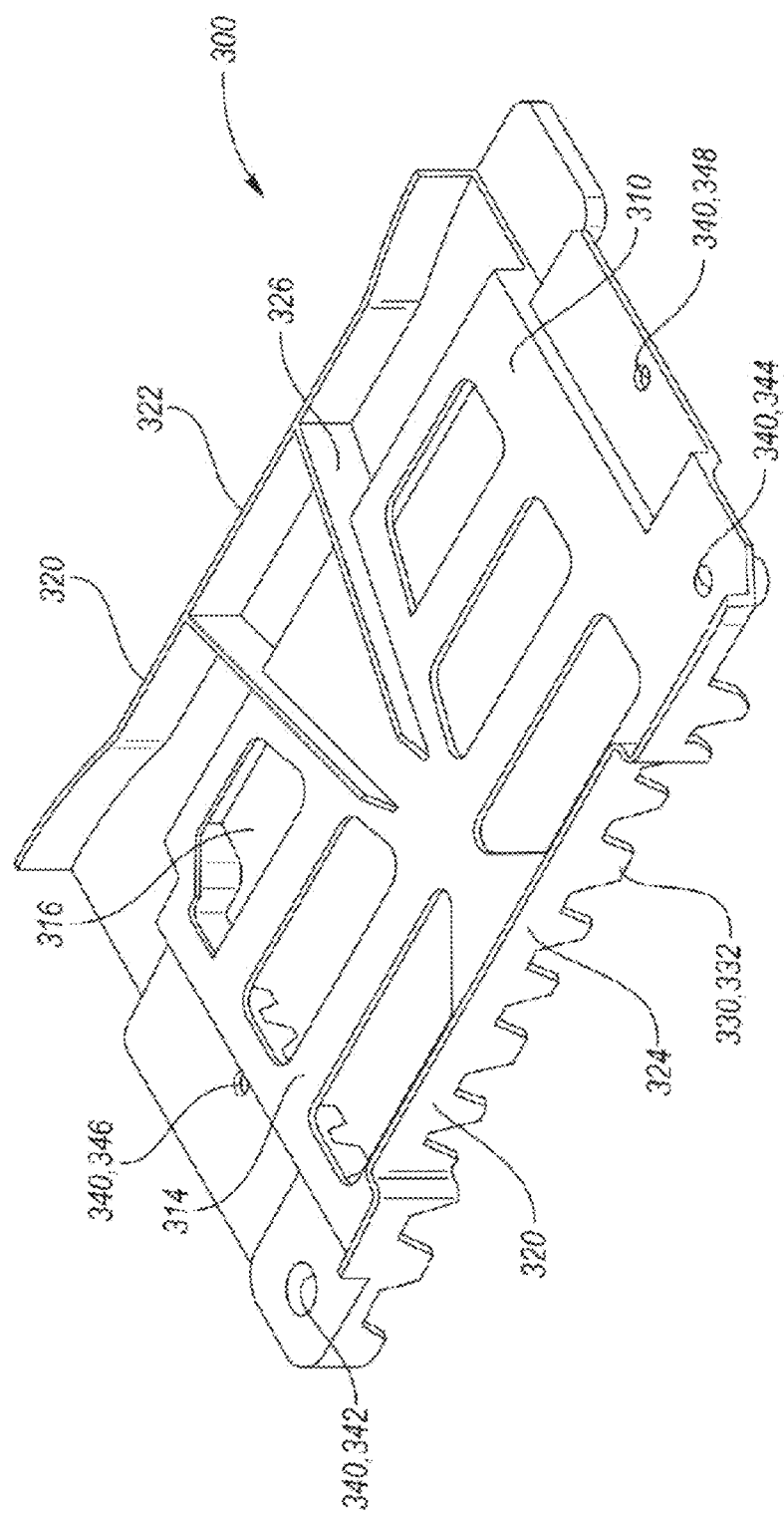
FIG. 13 is a top perspective view of another support structure.
Figure 17:
FIGS. 14-18 are front, back, left, right and top views of another support structure in FIG. 13.
Figure 14:
Figure 18:
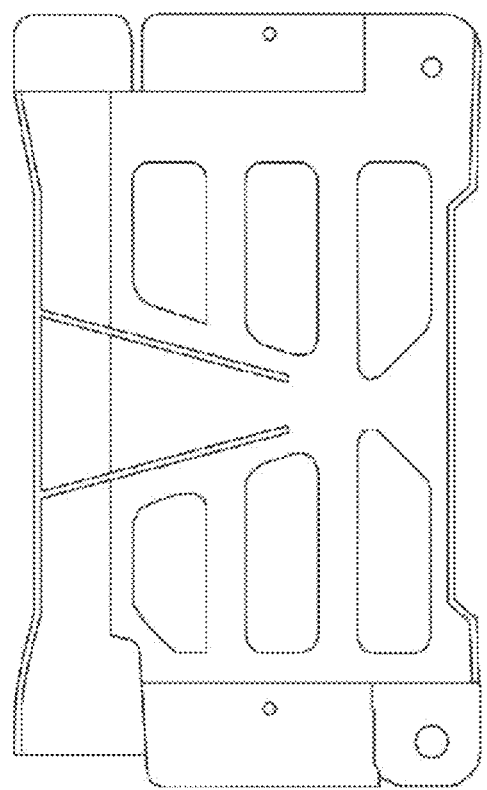
Figure 15:
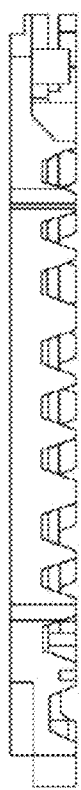
Figure 16:
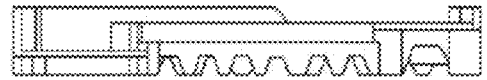
Figure 19:
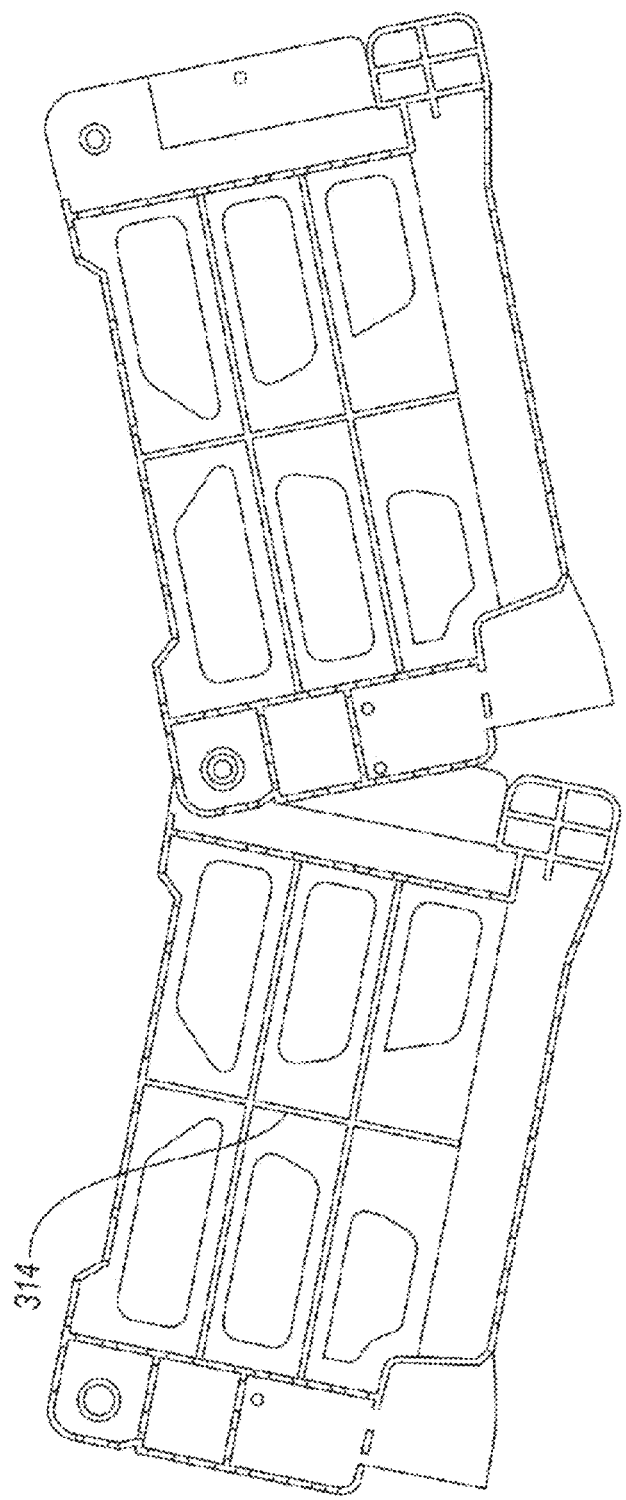
FIG. 19 is a bottom view of two support structures coupled together.

Securing/placing surface 314 may have one or more anchors 330 extending or protruding from surface 314. In one or more embodiments, the one or more anchors 330 may include one or more serrated walls 332 and/or attachable anchors 334, as shown in FIG. 5-6. Anchors 330 may be of any suitable shape and size for penetrating into the ground (e.g., grass, turf, dirt, and/or sand) and securing support structure 300 in position. Securing/placing surface 314 may be smooth or textured to assist in securing the support structure 300. In one or more embodiments, serrated walls 332 may be arranged along the peripheral edge of securing/placing surface 314. In another embodiment, serrated walls 332 may be arranged between and/or around the one or more irrigating orifices 316. In one embodiment, anchors 330 may extend from the securing/placing surface 314 in a second direction opposite the first direction.

Support structure 300 may have one or more fasteners 340 (e.g., coupling means) configured to couple multiple, additional, and/or adjacent support structures together to form a track. In at least one embodiment, support structure 300 may include a fastener 342 at first end 318 of base 310 and a fastener 344 at second end 319 of base 310. In an embodiment, another fastener 346 may be at first end 318 of base 310 and still another fastener 348 may be at second end 319 of base 310. The fasteners 342, 344, 346, and 348 may be the same or different. For example, fasteners 342, 344, 346, 348 may be a screw, bolt, nail, anchor, rivet, pin, rope, wire, chain, hinge, spring, dowel, button, clamp, clasp, flange, grommet, hook and eye, hook and loop, etc. In an embodiment, one or more of the fasteners 342, 344, 346, and 348 may include an annular ring (e.g., 342) and/or a protruding member (e.g., 344). For example, protruding member 344 of first support structure 302 may be disposed within annular ring 342 of an adjacently coupled second support structure 304. Alternatively, or additionally, one or more of the fasteners may include one or more orifices 346 and a pin/dowel 347. One or more of the fasteners may be adjustable such that it alters the shape or size of the predetermined shape. In a variation, each support structure may include multiple orifices 346 such that tracks of different shapes and sizes can be formed by coupling together different orifices 346 with a pin 347 or dowel. For example, each support structure 300 may include a first fastener 342 that is an annular ring, a second fastener 344 that is a protruding member, third fastener 346 may include one or more orifices (e.g., 2) and fourth fastener 348 may be one or more orifices (e.g., 5) such that the protruding member of a first support structure may be disposed in the annular ring of an adjacently coupled second support structure and the orifices of the third and fourth fasteners may be aligned with a pin disposed therein. The multiple orifices may allow for adjusting the shape or size of the predetermined shape. For example, each orifice may correspond to circles of different sizes such that it corresponds to a predetermined number of shaped bodies (e.g., 12 to 16 landscaping bricks).

A plurality of support structures 300 may be coupled together as described above such that they form a track. When at least two support structures 300 are coupled together they may form a framed section 350 within the walls 320 (e.g., inner and outer peripheral walls 322 and 324 and struts 326). A framed section 350 may be formed from the walls 320 of two separate support structures 300 when adjacently coupled together. The framed section 350 may have a shape and size configured to support a shaped body. The framed section 350 may include an elevated portion 321 of the support surface 322 and a depressed portion 323 of the support surface 322 such that a shaped body with a lip may be accommodated.

Support structures 300 may also include one or more overlapping portions 360 such as those accommodating fasteners. However, other overlapping portions 360 may be present to provide structural support and integrity when a plurality of support structures is coupled together such that a heavy shaped body (e.g., brick) may be supported without damaging the support structure 300 or disfiguring the predetermined shape. In an embodiment, each support structure 300 may have a first and second overlapping portion 360.

Shaped bodies 230 may be blocks (e.g., a cylinder/wooden block), bricks (e.g., a landscaping bricks), and/or pavers. Shaped body 230 may be stone, concrete, wood, masonry, plastic but may also be a material suitable for an outdoor environment such as masonry.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A track system for placing shaped bodies in a pattern comprising:
    a plurality of support structures each including:
        a support surface and a placing surface opposite the support surface;
        a placing strut extending from the support surface;
        one or more anchors extending from the placing surface; and
        first and second fasteners cooperatively configured to couple a support structure to an adjacent support structure of the plurality of support structures;
    wherein the plurality of support structures and placing struts cooperate when coupled together to provide framed sections that are configured to place a shaped body of the shaped bodies, each framed section including an elevated portion of the support and a depressed portion of the support surface such that the depressed portion is configured for a lip of the shaped body, the support surface having an inner edge with an inner peripheral wall extending therefrom, the inner peripheral wall having a first portion disposed on a first side of the support surface and a second portion disposed on a second side of the support surface opposite the first portion relative to the placing strut such that the framed sections are defined by the placing struts and the first portion of the inner peripheral wall of the first support structure cooperating with the inner peripheral wall of the second support structure.

2. The track system of claim 1, wherein the pattern is a predetermined shape.

3. The track system of claim 2, wherein each of the support structures includes third and fourth fasteners cooperatively configured to couple the support structure to the adjacent structure of the plurality of support structures.

4. The track system of claim 3, wherein the first, second, third and/or fourth fastener is adjustable to alter the size of the predetermined shape.

5. The track system of claim 4, wherein the shaped body is a landscaping brick.

6. The track system of claim 3, wherein the first fastener includes an annular ring, and the second fastener includes a protruding member configured to be disposed in the annular ring of an adjacently coupled support structure.

7. The track system of claim 6, wherein the third and fourth fasteners each include an orifice such that a pin can be disposed in the orifice of the third and fourth fasteners of adjacently coupled support structures when aligned.

8. The track system of claim 7, wherein the predetermined shape is round.

9. The track system of claim 8, wherein the predetermined shape is a circle or oval.

10. The track system of claim 9, wherein each support structure includes a first overlapping portion and a second overlapping portion such that the overlapping portions of adjacently coupled support structures overlap when coupled together.

11. The support structure of claim 1, wherein the support surface has an outer edge with an outer peripheral wall extending therefrom, the outer peripheral wall having a first region and a second region such that the framed sections are defined by the inner partitions, the first portion of the inner peripheral wall of the first support structure cooperating with the second portion of the inner peripheral wall of the second support structure, and the first region of the outer peripheral wall of the first support structure cooperating with the second region of the outer peripheral wall of the second support structure.

12. A support structure for placing shaped bodies comprising:
    a support surface and a placing surface opposite the support surface, the support surface having an inner edge with an inner peripheral wall extending therefrom;
    an inner partition protruding from the support surface extending across the support surface, the inner peripheral wall having a first portion disposed on a first side of support surface and a second portion disposed on a second side of the support surface opposite the first portion relative to the inner partition;
    one or more anchors protruding from the placing surface; and
    first and second fasteners cooperatively configured to couple the support surface to an additional support surface such that when a plurality of support structures are coupled to form a track, the track defines framed sections configured to place a shaped body of the shaped bodies, the framed sections being defined by a first inner partition of a first support structure, a second inner partition of a second support structure, and the first portion of the inner peripheral wall of the first support structure cooperating with the second portion of the inner peripheral wall of the second support structure.

13. The support structure of claim 12, wherein the support surface has one or more irrigating apertures.

14. The support structure of claim 12, wherein the one or more anchors include serrated walls.

15. A landscaping barrier comprising:
    a plurality of support structures that when coupled together define sections, at least one support structure from the plurality of support structures including:

a base having a framing wall extending in a first direction from the base and an inner edge with an inner peripheral wall extending therefrom, the inner peripheral wall having a first portion disposed on a first side of the base and a second portion disposed on a second side of the base opposite the first portion relative to the framing wall;

one or more anchors extending from the base in a second direction; and a coupling means for coupling the at least one support structure to at least two other support structures from the plurality of support structures;

wherein the sections, defined by the framing walls of adjacent support structures, the first portion of the inner peripheral wall of the first support structure, and the second portion of inner peripheral wall of the second support structure such that the sections are each configured to frame shaped bodies, each shaped body being supported by the base of at least two support structures.

16. The landscaping barrier of claim 15, wherein the coupling means is an adjustable coupling means.

17. The landscaping barrier of claim 15, wherein the first direction is opposite the second direction.

18. The landscaping barrier of claim 15, wherein the plurality of shaped bodies is a plurality of masonry blocks.

19. The landscaping barrier of claim 15, wherein the sections each include an elevated portion of the base and a depressed portion of the base such that the depressed portion is configured to receive a lip portion of the shaped body.

* * * * *